US012808334B2

(12) United States Patent
Snodgrass et al.

(10) Patent No.: US 12,808,334 B2
(45) Date of Patent: Nov. 24, 2026

(54) SYSTEMS AND METHODS FOR DUAL, MOTOR-DRIVEN PUMPING AND DIRECT METERING

(71) Applicant: Woodward, Inc., Fort Collins, CO (US)

(72) Inventors: Brett J. Snodgrass, Byron, IL (US); Paul J. Schaefer, Rockton, IL (US); Brett Flannery, Poplar Grove, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/430,122

(22) Filed: Feb. 1, 2024

(65) Prior Publication Data

US 2024/0263589 A1 Aug. 8, 2024

Related U.S. Application Data

(60) Provisional application No. 63/483,137, filed on Feb. 3, 2023.

(51) Int. Cl.

*F02C 7/236* (2006.01)
*F02C 9/26* (2006.01)
*F02C 9/30* (2006.01)

(52) U.S. Cl.

CPC ................ *F02C 9/30* (2013.01); *F02C 7/236* (2013.01); *F02C 9/263* (2013.01); *F05D 2270/52* (2013.01)

(58) Field of Classification Search

CPC ............... F02C 7/22; F02C 7/236; F02C 9/30
See application file for complete search history.

(56) References Cited

U.S. PATENT DOCUMENTS 2,812,715 A 11/1957 Redding et al.
6,487,847 B1 * 12/2002 Snow ........................ F02K 3/10 60/764
2002/0038540 A1 * 4/2002 Griffiths .................. F02C 7/228 60/734
2007/0107435 A1 * 5/2007 Bickley ................... F02C 7/236 60/773
2010/0089025 A1 * 4/2010 Baker ....................... F02C 9/30 137/565.29
2012/0045348 A1 * 2/2012 Garry ...................... F04B 23/04 417/302

(Continued)

FOREIGN PATENT DOCUMENTS

CA 2740619 2/2015
CA 2740743 2/2015

OTHER PUBLICATIONS

Int'l Search Report and Written Opinion Appln No. PCT/US2024/014135 mailed Jul. 24, 2024.

(Continued)

*Primary Examiner* — Gerald L Sung
(74) *Attorney, Agent, or Firm* — McAndrews, Held & Malloy, Ltd.

(57) ABSTRACT

Systems and methods are provided for a dual-pump fuel delivery system. The system includes a primary pump to deliver a first fluid flow to the engine via a pump outlet. A secondary pump delivers a second fluid flow and a fuel metering valve to return the second fluid flow to a pump inlet in a first position, and to channel the second fluid flow to the pump outlet in a second position.

20 Claims, 8 Drawing Sheets

(56) References Cited

U.S. PATENT DOCUMENTS

| | | | | |
|---|---|---|---|---|
| 2012/0156061 | A1* | 6/2012 | Baker | F02C 7/236 417/288 |
| 2012/0207626 | A1 | 8/2012 | Dalton | |
| 2012/0266600 | A1 | 10/2012 | Bader et al. | |
| 2014/0311599 | A1 | 10/2014 | Haugsjaahabink | |
| 2020/0123986 | A1* | 4/2020 | Hahn | G05D 7/0126 |

OTHER PUBLICATIONS

Int'l Preliminary Report on Patentability Appln No. PCT/US2024/014135 mailed Aug. 14, 2025.

* cited by examiner

SYSTEMS AND METHODS FOR DUAL, MOTOR-DRIVEN PUMPING AND DIRECT METERING

CROSS REFERENCE TO RELATED APPLICATIONS

This application is a Non-Provisional Patent Application of U.S. Provisional Patent Application No. 63/483,137 entitled "Systems And Methods For Dual, Motor-Driven Pumping And Direct Metering" filed Feb. 3, 2023, which is herein incorporated by reference in its entirety.

BACKGROUND

Conventional fuel systems consist of one or more positive displacement pump elements and metering system elements to regulate fuel delivered to engine burn flow. In such a system, fuel excess at the port pump flows back to the pump inlet. The pump return flow is then combined with fresh fuel from the tank, where it repeats the process of passing through the pump and the metering system, etc. This cycle may occur several times depending on the operating condition of the engine.

However, the returned pump flow results in wasted energy and additional heat added to the fuel, resulting in reduced heat rejection capability of the fuel. Thus, systems and methods that improve delivery of the pump flow are desirable.

SUMMARY

Systems and methods are disclosed for a dual-pump fuel delivery system, substantially as illustrated by and described in connection with at least one of the figures. In particular, variable and fixed positive displacement pump elements and flow sensing and control elements are arranged to meet actuation needs and control fuel delivery, as disclosed herein.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 1A:
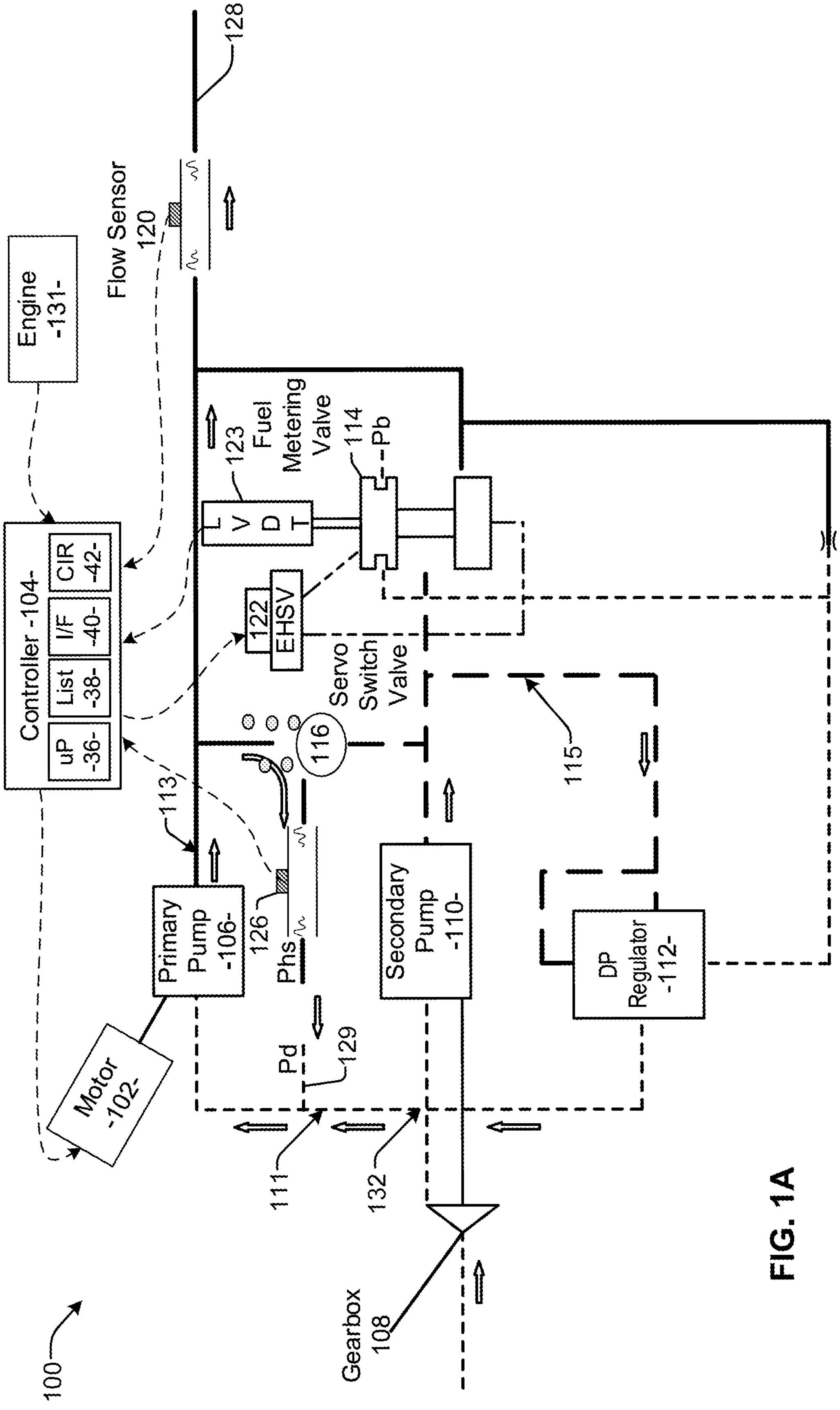
FIGS. 1A and 1B are functional diagrams of example systems employing dual pumps to deliver fuel to an engine, in accordance with aspects of this disclosure.

The present disclosure provides systems and methods for a dual-pump fuel delivery system. For example, the system includes a variable speed motor connected to a primary pump to deliver a first fluid flow to the engine via a pump outlet. A secondary pump delivers a second fluid flow. A bypass valve returns the second fluid flow to a pump inlet when a fuel metering valve is in a first position, and channels the second fluid flow to the pump outlet when the fuel metering valve is in a second position. A high speed, high accuracy fuel flow meter is employed with control logic that manipulates the motor 102 speed and metering valve position 114 to satisfy all engine fuel delivery needs.

In conventional systems, fuel pumping and metering often requires a portion of pump flow to be returned to the pump inlet and/or reservoir instead of being directly passed with the metered flow. The returned pump flow results in wasted energy and additional heat added to the fuel, resulting in reduced heat rejection capability of the fuel.

Fuel pumping and metering systems that directly port flow to the metering system with no flow returned to the pump inlet are preferred, but often result in excess system weight and/or complex system components, which sacrifice reliability and time-on-wing functionality.

The proposed fuel delivery system maintains pedigree reliability and provides direct metering to the engine with minimal impact to fuel system weight. For example, the disclosed fuel delivery system integrates one or more fuel pumping elements, as well as a relatively low power motor element to drive at least a portion of the pumping elements. The system may further include a high speed flow sensing device (e.g., a flow sensor), and/or one or more fuel valves to control direction, pressure, and/or fluid metering functions. Electromechanical actuation is also employed in some examples. Electronic controls can be employed to read the flow sensors and/or control the motor and actuation elements in some examples.

Conventional systems that hope to accommodate a wide range of engine operating conditions typically incorporate positive displacement pumps driven by a variable speed motor. Such motors are quite large and heavy and contribute to system weight and cost. Moreover, some motor driven systems exhibit poor reliability, primarily due to motor controller limitations.

The disclosed system is capable of adjusting the motor sizing point to include steady state operating conditions (exclusively, if so desired) from a minimum start point through cruising conditions. One or more of these conditions may contain the thermal pinch points of the system. Employing a relatively small motor and pump size results in the added benefit of reduced inertia, thereby allowing the motor driven system to quickly change operational parameters to satisfy changes in the ongoing conditions (e.g., low amplitude transients).

For example, during high power and/or transient conditions, a secondary pumping system can be engaged to satisfy one or more of engine burn flow and/or servo transient needs of the engine. This secondary pumping system closely replicates pedigree fuel system design, offering high reliability and good disturbance rejection. While the secondary system is active, the primary system may operate in various modes, such as maintaining a steady state motor speed, and/or continuously controlling motor speed, and thereby pump flow, to better track severe engine transients. Advantageously, the disclosed secondary pump/metering system is capable of meeting the entire normal operating envelope, allowing continued engine operation in the event of a failed motor controller.

Other enabling technologies include high speed fuel flow sensors that allow for relatively fast and accurate fuel flow feedback (e.g., provided to the controller 104) to close a loop on engine fuel flow demands. Servomechanism (i.e. servo) switching is also an enabling technology, allowing servo demands to quickly change from the primary pump source to secondary pump source.

As used herein, a circuit includes any analog and/or digital components, power and/or control elements, such as a microprocessor, digital signal processor (DSP), software, and the like, discrete and/or integrated components, or portions and/or combinations thereof.

As used herein, the terms “first” and “second” may be used to enumerate different components or elements of the same type, and do not necessarily imply any particular order. For example, while in some examples a first compartment is located prior to a second compartment in an airflow path, the terms “first compartment” and “second compartment” do not imply any specific order in which airflows through the compartments.

Moving onto the drawings, FIG. 1 illustrates a system 100 that pairs a variable speed motor 102 with a primary pump 106, and includes a secondary pump 110 sized to provide engine burn flow. In some examples, the motor 102 is one of an electric drive motor or a hydraulic drive motor, although other suitable drive motors are considered. In some examples, one or both of the primary or secondary pumps 106 and 110 are positive displacement pumps, although other suitable pump types are considered.

The combination of the primary and secondary pump satisfies system leakage flow, and/or a prescribed amount of servo flow plus transient flow over the engine operating range, from minimum start through elevated (e.g., maximum) fuel flow conditions. In some examples, the secondary pump 110 has a size and/or capacity greater than the primary pump 106. In other examples, both pumps are of equal size and/or capacity, or the secondary pump can have a lesser size and/or capacity than the primary pump.

When demand for fuel flow from a minimum level (e.g. at engine start) through a steady fuel flow level (e.g., at cruising) is communicated by the controller 104, the engine metered flow is monitored or controlled via a high speed flowmeter valve or sensor 120. The controller 104 adjusts a speed of the primary motor 102 to satisfy these flow demands with no excess fluid flow. During these operating conditions, the secondary pumping and metering system including the secondary pump 110 is isolated from the primary metering system, such that full pump flow is regulated at low pressure so as to conserve as much energy as possible while maintaining minimum pump loading.

Fluid flow from the secondary pump 110 is returned to pump inlet 132 through a delta pressure (DP) regulator or regulating device 112 that, during a secondary operating mode, acts to pressurize flow at the secondary channels 115 to a minimal level (e.g., approximately 100 pounds-per-square-inch-differential (PSID) above inlet pressure). In some examples, the DP regulator 112 is a bypass valve, such as an integrated pressure bypass valve, or similar. For instance, fluid flow through the secondary channels 115 fed from the secondary pump 110 is generally at a mid-pressure range, in comparison to primary channels 113 fed from the primary pump 106, with fluid flow at a relatively higher pressure range.

Also at this condition, servo flow is provided from the motor driven primary pump 106 via a servo switching valve 116 (which may be a passive valve). The controller 104 continually monitors engine demand flow and engine servo flow (by feedback from the servo switch valve 116 and/or from one or both of flow sensors 120 and/or 126), and compares feedback signals to actual engine flow. Fluid draw at the servo switch valve 116 is also monitored. In this way, if one or both of demand from flow or switch valve 116 draw exceeds capacity of the primary pump 106, the controller 104 then sends a signal to electrohydraulic servo valve (EHSV) 122 to position the fuel metering valve 114 to a regulating position.

Figure 1B:
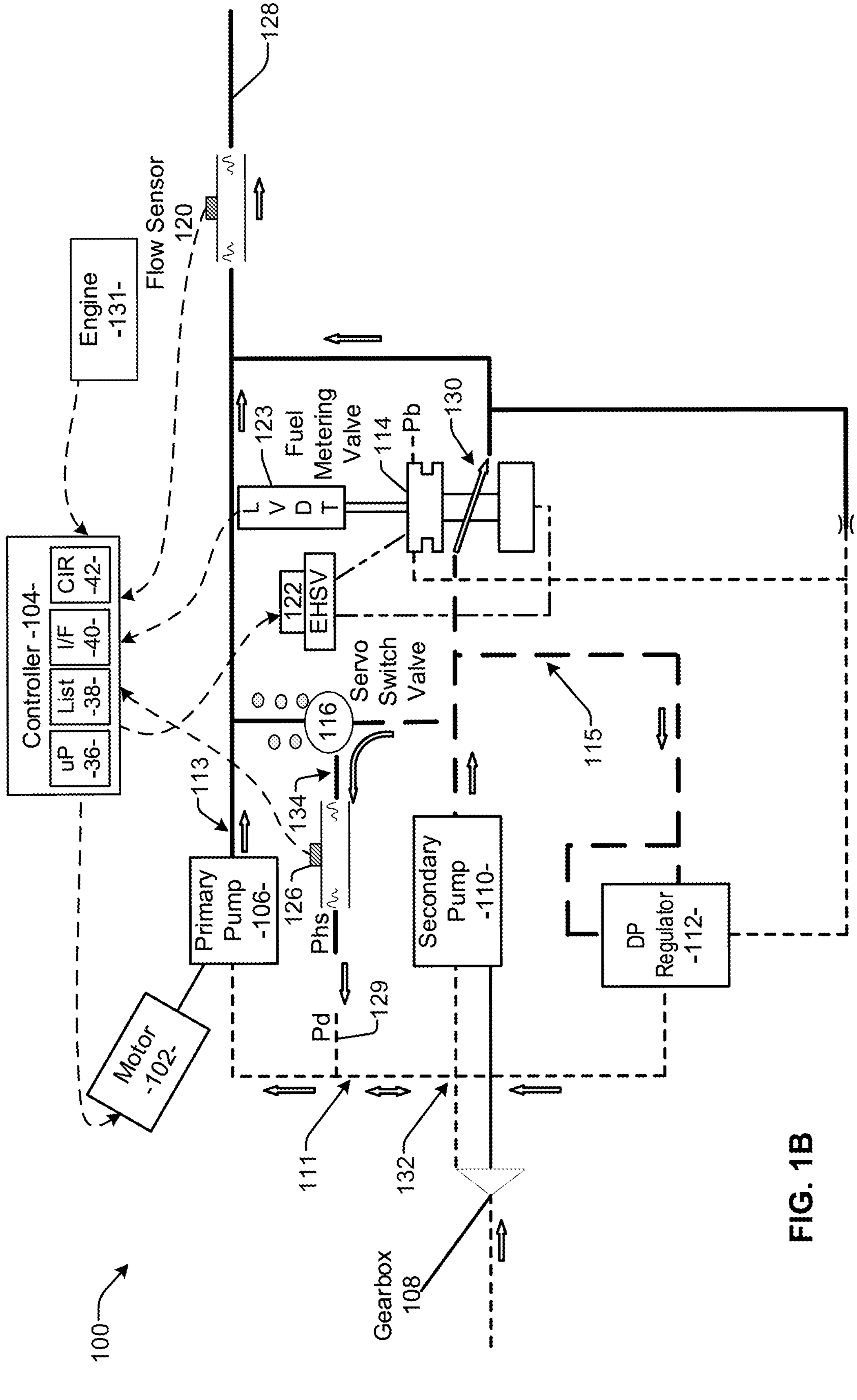

When demand for increased flow above the capability of the primary pump 106 is communicated by the controller 104, the secondary pump 110 is activated, as shown in FIG. 1B. As shown, the EHSV 122 adjusts a position of the fuel metering valve 114 to regulate fuel delivery, which is measured by linear variable differential transformer (LVDT) 123 and communicated to the controller 104. This change in position of the fuel metering valve 114 allows fluid to flow from between primary channels 113 and secondary channels 115 at valve opening or fuel metering port 130, thereby sending pressurized fluid through the fuel metering valve 114 to supplement flow at engine discharge 128. During operation, speed of a gearbox 108 and therefore the secondary pump 110 is set by the engine operating speed.

Fluid flow pressure in the secondary channels 115 (e.g., at channels 115, opening 130) is greater than the primary channels 113 (e.g., approximately 50 PSI higher), regardless of the fuel delivery split between the primary pump 106 and the secondary pump 110. For example, the pressure from the secondary pump 110 (and associated channel 115) may be greater than the pressure from the primary pump 106 (and associated channel 113).

Regulating fluid flow through the fuel metering valve 114 results in at least the following two actions: (1) the fuel metering port 130 opens to add fuel flow to the primary pumping system to meet engine demand, and (2) a reference pressure to the bypass valve 112 is changed, such that the bypass valve 112 now provides a constant pressure drop across the fuel metering port 130 (e.g., at approximately 50 pounds-per-square-inch-differential (PSID)). The servo switching valve 116 reacts to the increase in discharge pressure from the secondary pump 110, and changes position to allow secondary pump flow to port to the servo system (engine actuation) through channel 134. In this way, the secondary pump 110 satisfies or mitigates large servo transients and the high engine flow demands.

The secondary pump 110 is employed to provide additional output, in response to engine demand. For example, when demand for fluid flow exceeds a given flow threshold characteristic (e.g., fluid volume, rate, pressure, etc.), the secondary pump can be activated to supplement flow from the primary pump. Advantageously, a smaller primary pump can be employed with a lower output, which may be sufficient over a wide operating range. When demand at the engine increases, the secondary pump is activated to meet demand, thereby allowing for a smaller, cheaper, lighter, and more responsive primary pump.

In some examples, the controller 104 is connected to and/or in wired and/or wireless communication with one or more of an engine 131, the motor 102, the EHSV 122, the LVDT 123, the sensor 120, and/or the sensor 126, as a list of non-limiting examples. The controller 104 includes one or more components and/or circuitry such as a microprocessor/controller 36, a memory storage device 38 (e.g., including a listing, matrix, library, etc.), and/or one or more interfaces 40 (e.g., including a user interface, a network interface, a communications interface, etc.).

In some examples, the motor 102 receives power (e.g., electrical and/or mechanical power) from a power source (e.g., a battery, a generator output, an engine, etc.). The controller 104 is configured to regulate power delivery at the motor 102, by controlling operation of one or more circuits 42 (e.g., control circuits, power conversion circuits, etc.). Although circuits 42 are illustrated as located on the controller 104 in the example of FIG. 1A, in some examples the circuits 42 can be located remotely. Further, the example system 100 may include other components not specifically discussed herein.

In some disclosed examples, the one or more lists 38 (e.g., lookup tables (LUT), matrices, algorithmic functions, etc.) are accessible to and/or contained within the controller 104 (logically and/or physically) to provide an expected, calculated, and/or relative adjustment to the primary or secondary pumps. This calculation can be a function of one or more operating parameters, which may include one or more of speed of the engine and/or motor, volumetric fluid flow, inlet or outlet pressure, and/or fuel temperature, as a list of non-limiting examples. In some examples, the controller can adjust operation of the fuel pumps and/or valves in response to the monitored and/or received data falling outside a range of predetermined threshold values (e.g., stored and accessed via the lists 38).

Some vehicles do not employ a gearbox, and therefore employ another mechanism to drive the secondary pump and therefore deliver fuel to an engine (e.g., combustor). In some examples, employing a motor-driven fuel pump enables fuel systems to operate without the use of a gearbox, as well as controlling pump speed independently of engine operating conditions.

Figure 2A:
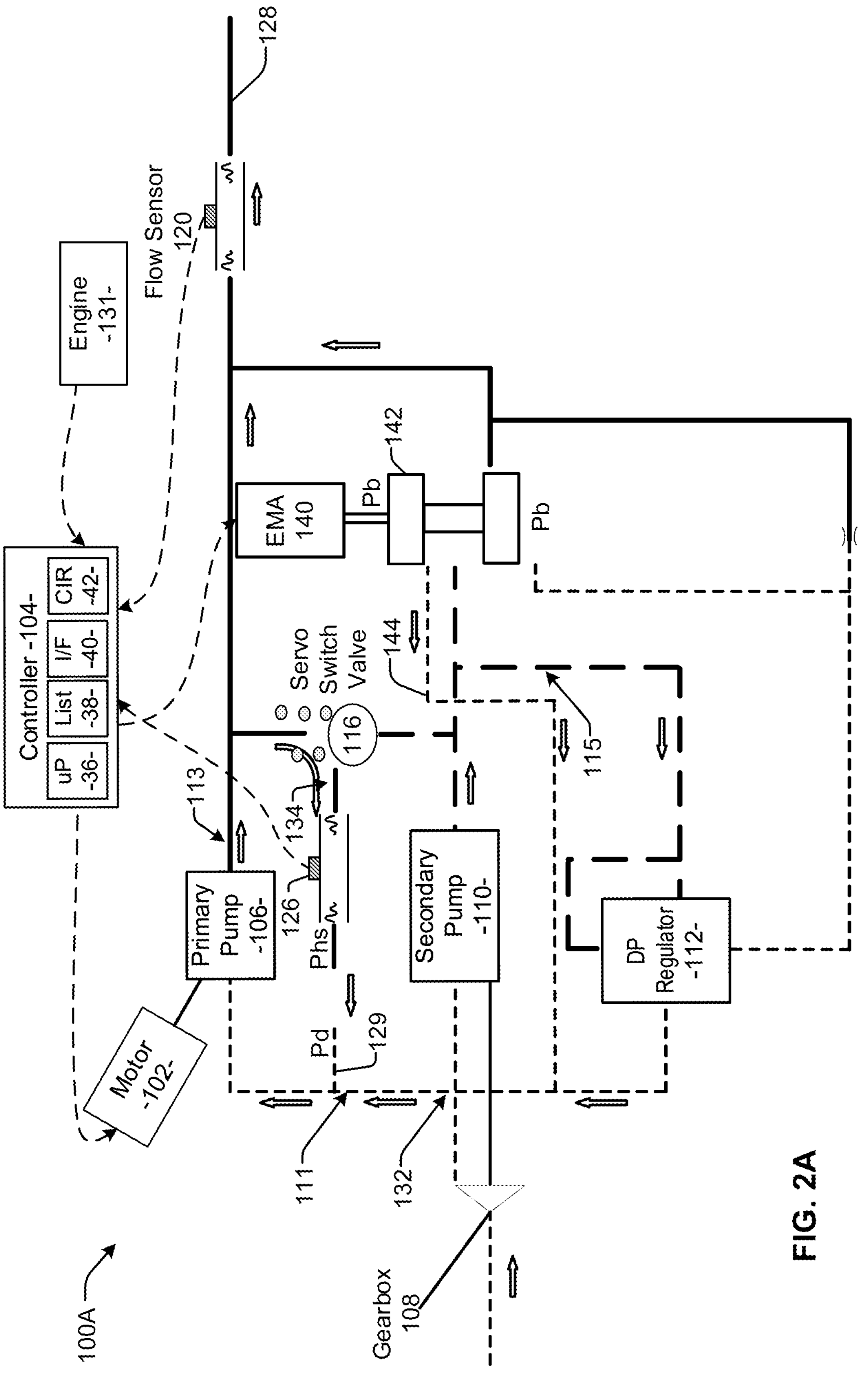
FIGS. 2A and 2B are functional diagrams of other example systems employing dual pumps to deliver fuel to an engine, in accordance with aspects of this disclosure.
Figure 2B:
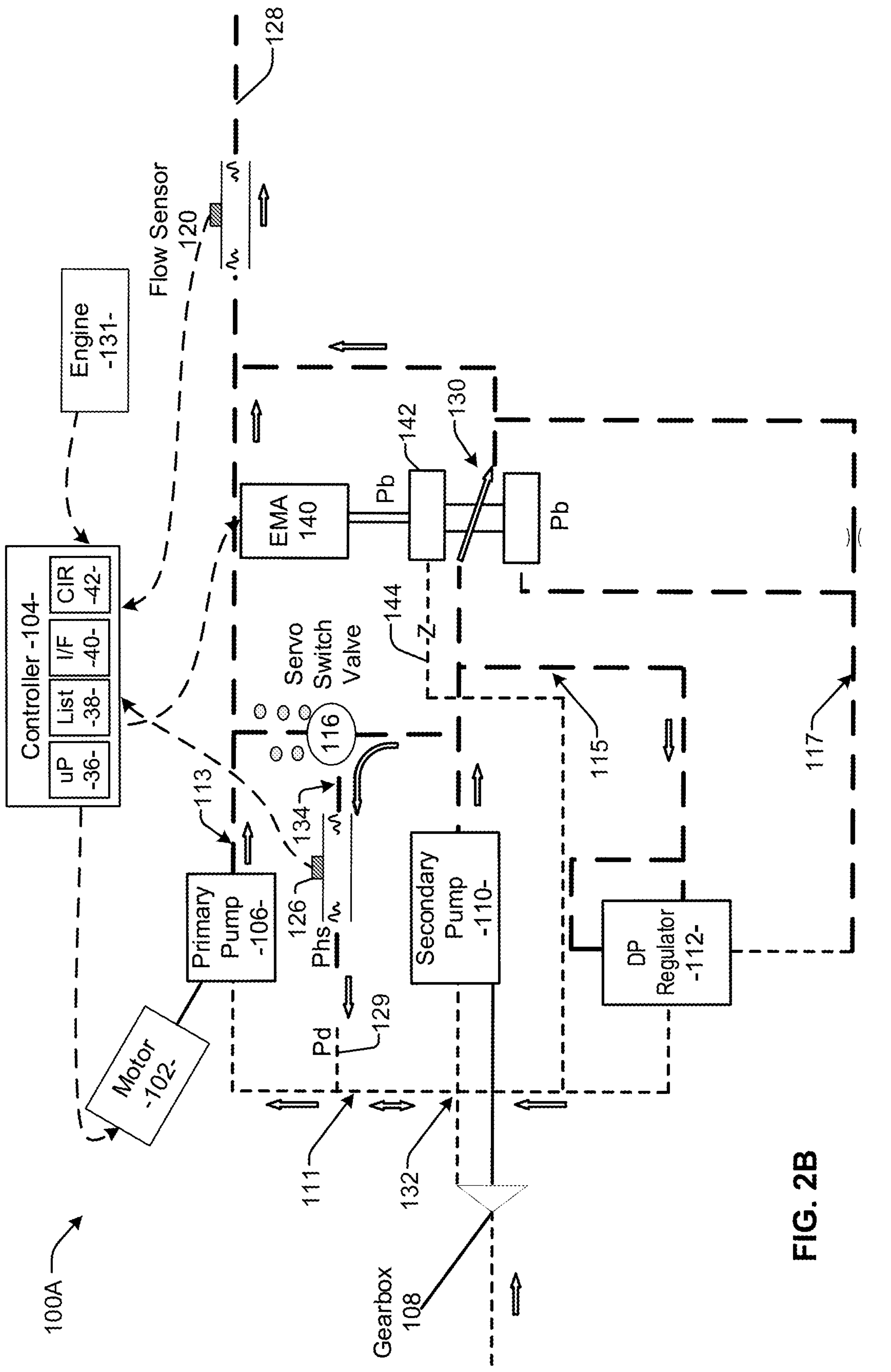

FIGS. 2A and 2B are functional diagrams of other example systems employing dual pumps to deliver fuel to an engine. FIG. 2A illustrates the system 100A of FIG. 1A with several modifications. As shown, the electrohydraulic servo valve 122 controlling the fuel metering valve 114 is replaced with a linear motor drive or electromechanical actuator (EMA) 140 to provide position control to fuel metering valve 142. These components serve to increase the speed at which the fuel metering valve can achieve a desired position, and eliminates the associated servo draw (fuel metering valve 142) for positioning the fuel metering valve by employing EMA 140. In examples, the fuel metering valve is pressure balanced, and is designed to experience little friction during operation, thereby allowing a low power, low weight EMA to be used.

In some examples, a bypass flow path port or channel 144 is added to the fuel metering valve to provide an additional or alternative path for the fluid flow from the secondary pump 110 to pass to the pump inlet 132 while the primary pump 106 is in sole operation. The port 144 allows the controller 104 to regulate fluid flow through the bypass valve 112, by adjusting the valve to a known and/or desired position associated with a predetermined flow rate, pressure, or other applicable operating parameter. This is beneficial in the event an engine transient occurs that requires the secondary pump 110 to quickly become active, at which time the position of the bypass valve 112 is already near the desired position, thereby averting disturbances (e.g., due to bypass slew rate limitations).

In the dual pumping mode illustrated in FIG. 2B, opening of the fuel metering valve 142 results in three events: (1) fuel flow from channel 115 to channel 144 is closed, thereby eliminating a second bypass path; (2) fuel port 130 is opened to allow fluid flow from secondary pump 110 to engine discharge 128; and (3) a pressure balance (Pb) port is deadheaded, allowing pressure from channel 113 to communicate with the bypass valve 112 reference pressure via channel 117. As a result, the bypass valve 112 transitions from a pressurizing valve to maintaining a pressure level across the fuel metering valve path 130 (e.g., at approximately 50 PSID).

Figure 3A:
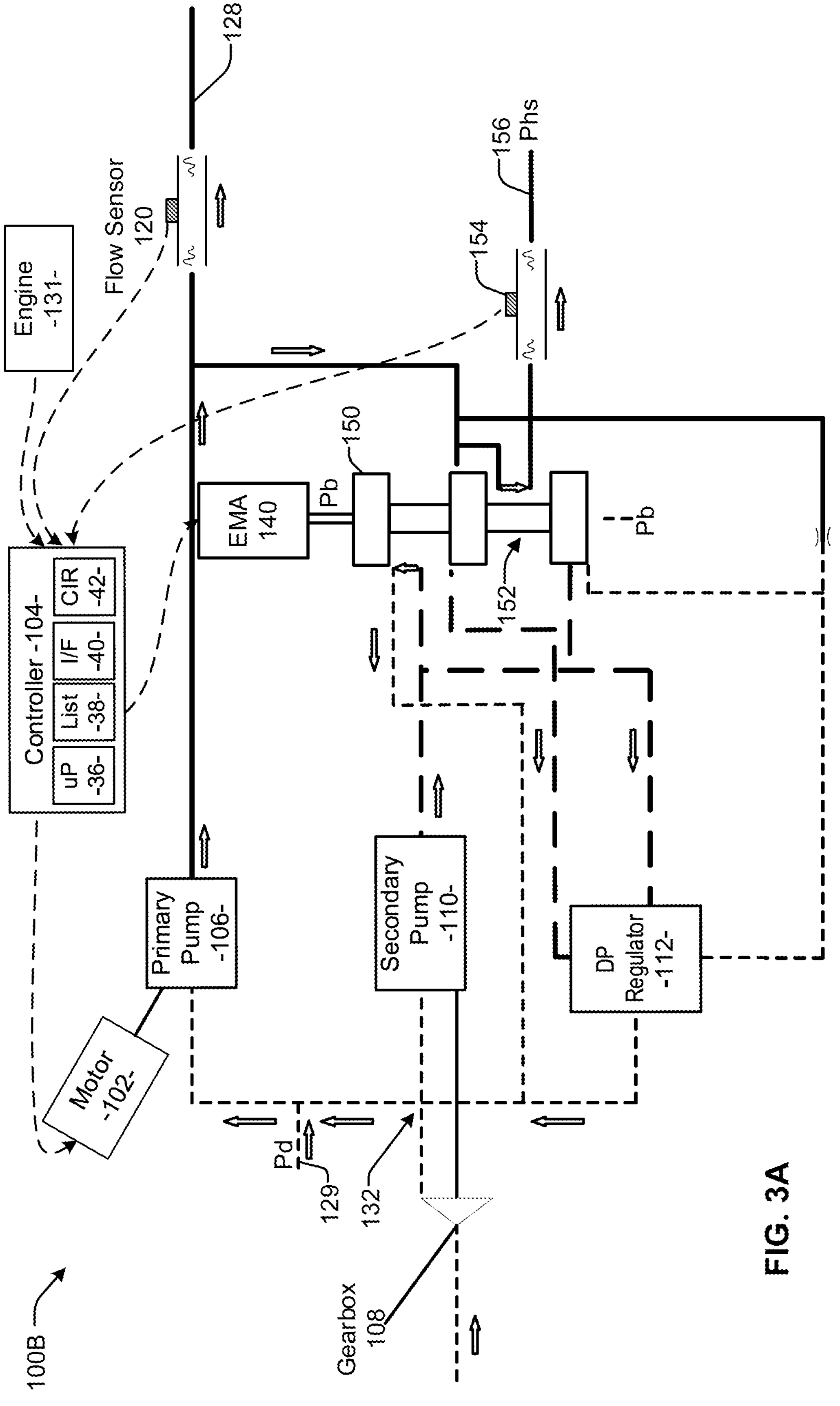
FIGS. 3A and 3B are functional diagrams of other example systems employing dual pumps to deliver fuel to an engine, in accordance with aspects of this disclosure.
Figure 3B:
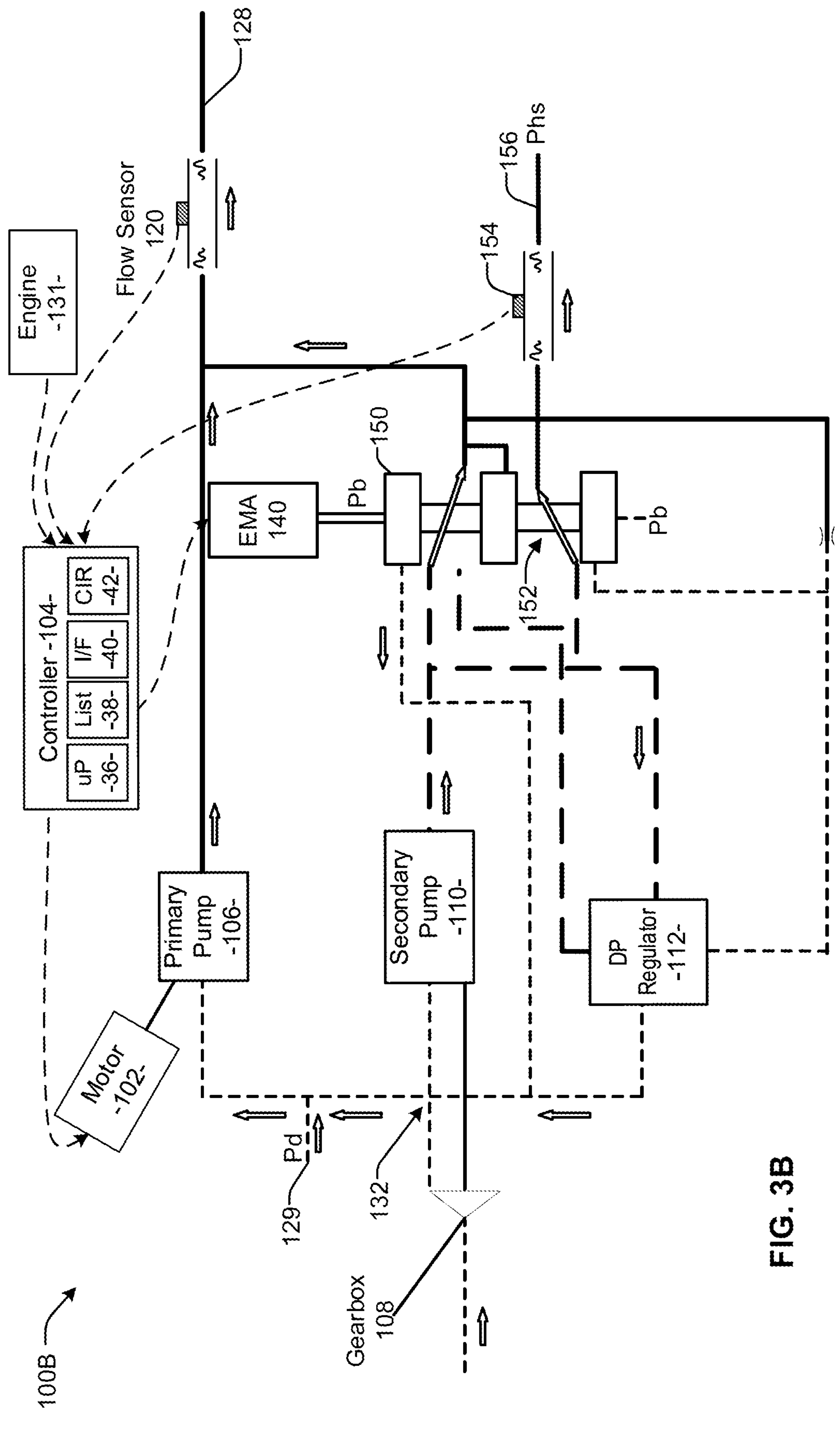

FIGS. 3A and 3B are functional diagrams of other example systems employing dual pumps to deliver fuel to an engine, in accordance with aspects of this disclosure. FIG. 3A illustrates a system 100B, similar to system 100A of FIG. 2A with several modifications. In the system 100B, the servo switching valve 116 is removed, and a fuel metering valve 150 includes a greater number of lands. For example, the adjusted fuel metering valve land 152 provides porting that controls the servo flow source from either the primary pump 106 or secondary pump 110. Integrating the servo switch from an independent valve that is switch based on pressure (as shown in the system 100A), to an integrated switch on the fuel metering valve 150 allows the system to be designed to more accurately control timing of the servo switch feature, and the rate at which the servo switch is activated. When to control the switch can be informed by flow characteristics measured at flow sensors 120 and/or 154, communicated to the controller 104.

As shown in FIG. 3B, upon activating the fuel metering valve 150, the fuel metering valve land 152 channels fluid to a secondary output 156 providing servo flow needs to the engine, which is then returned to the pump inlet via the pump discharge (Pd) discharge port 129 in channel 132.

Figure 4:
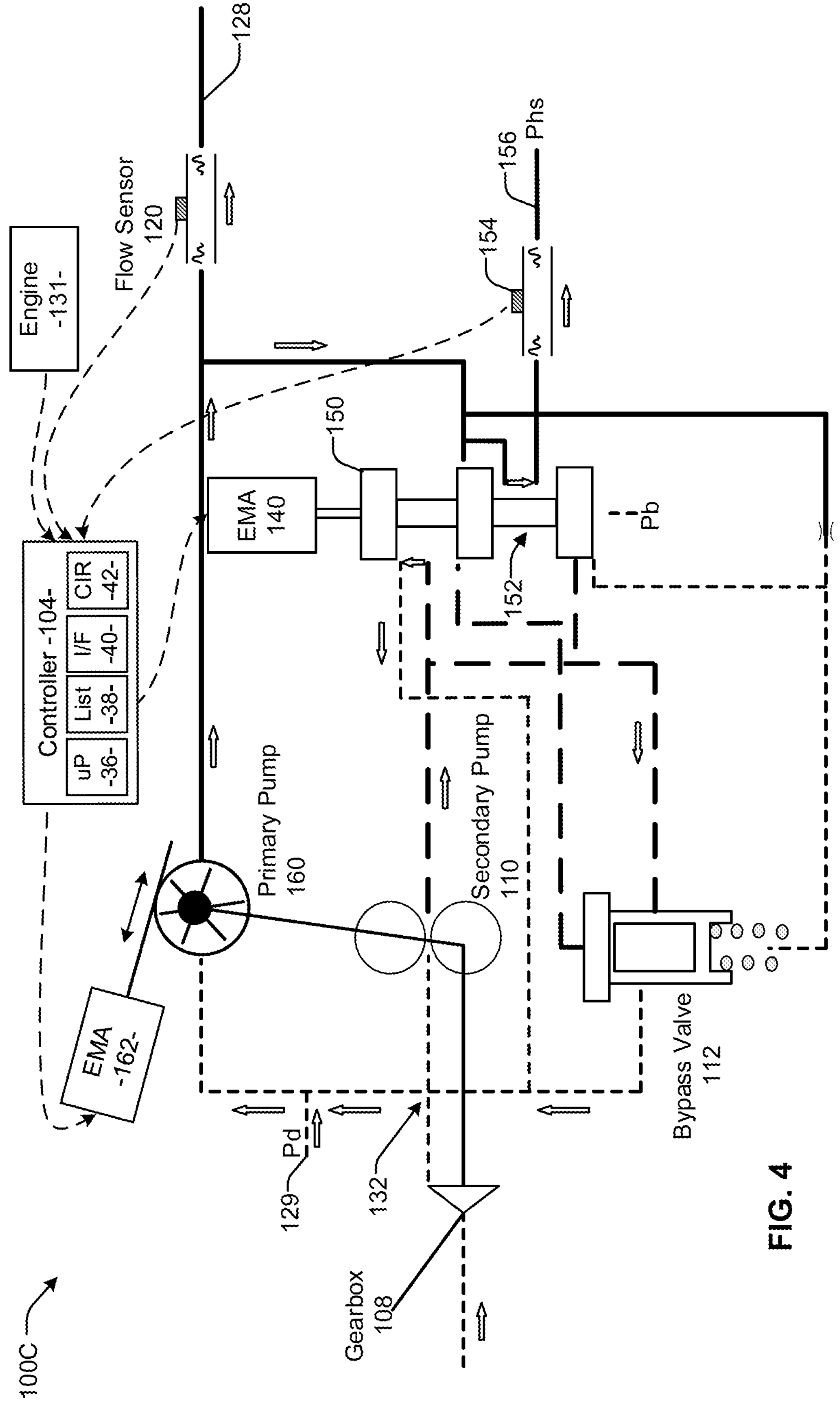
FIG. 4 is a functional diagram of another example system employing dual pumps to deliver fuel to an engine, in accordance with aspects of this disclosure.

FIG. 4 is a functional diagram of another example system employing dual pumps to deliver fuel to an engine. FIG. 4 illustrates a system 100C, similar the system 100B of FIG. 3A with several modifications. As shown, the primary pumping element is an example variable displacement pump 160, rather than a motor driven positive displacement pump (e.g., pump 106, driven by motor 102). Although some examples describe the primary pumping element as a variable displacement pump, a variety of pump types may be suitable for one or more applications.

In the example of FIG. 4, an electromechanical actuator 162 drives the variable displacement pump 160 (e.g., via a cam) to achieve a desired fluid flow from a minimum flow at engine idle, and through operation to cruising. This scheme is best sized at low engine start conditions using both primary and secondary pumping systems.

In some examples, operating speed of one or both of the pumps 160 and 110 is limited to the speed of the engine (i.e. versus an independently powered motor drive). An advantage of such a pump, in comparison to other variable displacement pump, is that this design significantly reduces the maximum displacement required to deliver fuel to the engine (e.g., approximately 90% reduced displacement compared to a variable displacement pump only driven system). Thus, the system 100C provides the advantage of a backup metering system in the event variable displacement pump failure occurs.

Although FIG. 4 illustrates the pump 160 as integrated in a system similar to system 100B shown in FIGS. 3A and 3B, the pump 160 may be employed in the system 100 of FIGS. 1A and 1B, and/or the system 100A of FIGS. 2A and 2B.

The disclosed exemplary systems employing multiple pumps provide multiple advantages over conventional fuel delivery systems.

For instance, pump sizing often occurs at low engine speed conditions (e.g., approximately 7-10% engine speed). The disclosed dual pump systems eliminate this pinch point by using the primary, motor driven pump to satisfy low engine speed start conditions. In this way, given the low engine speed, motor speed to drive the primary pump can be controlled independent of engine speed. For example, at an engine speed of approximately 7% of engine capacity, the motor speed can be controlled to achieve 20% capacity, resulting in a much improved pumping efficiency over conventional systems.

As noted, pump time-on-wing is often dictated by low speed performance. In such a system, the primary pump is less susceptible to early wearing-out since it is motor driven, and often operates in a speed range where volumetric efficiency remains high. In addition, the motor speed of the primary pump can be adjusted independent of engine speed. In other words, as the primary pump wears, higher motor speeds can be provided to offset the associated efficiency loss.

The secondary pump is also less susceptible to early wear-out, since it is typically not used at low engine speeds. Additionally, it also remains at a low pressure condition for the majority of its operating life (e.g., idling speed through cruising speed), which also reduces a wear rate of the secondary pump.

Although some example systems provide direct metering only from idle through cruising speed, any flowmeter accuracy advantage of using a high speed flow sensing device occurs over all engine operating speeds and/or conditions. These efficiencies are achieved via the controller by continually monitoring engine burn flow, and adjusting the flow from the fuel metering valve accordingly. Diagnostic determinations can be implemented by comparing an expected metering valve position against a demand from the controller, which provides data concerning pump metering system integrity.

Figure 5:
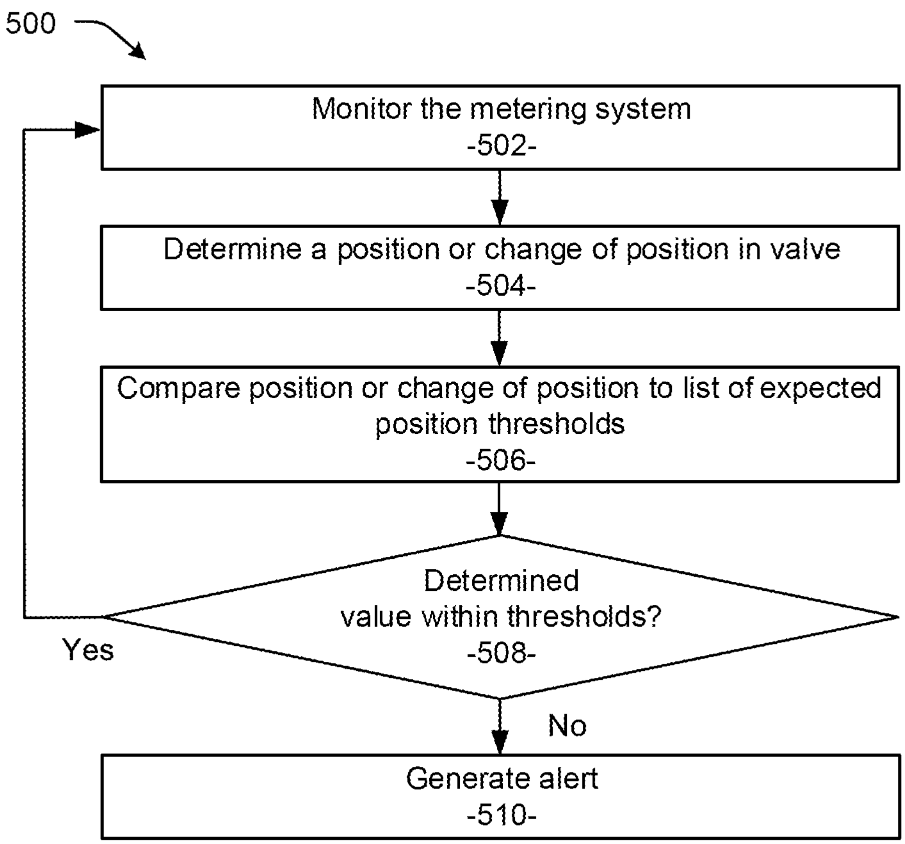
FIG. 5 provides an example diagnostic method to monitor performance of a metering system, in accordance with aspects of this disclosure.

In an example diagnostic method 500 shown in FIG. 5, the controller 104 monitors the metering system performance in block 502. For instance, an amount of activation, extension, and/or movement of the actuator 140 can be determined, measured and/or used to calculate a position and/or changes in position of the fuel metering valve 150 in block 504. In some examples, a sensor may be additionally or alternatively employed to monitor position and/or changes in position. In block 506, an expected position of fuel metering valve 150 (e.g., from a list of expected position values stored in example list 38) is compared to a measured or calculated position of the fuel metering valve 150.

In block 508, the controller 104 determines if the expected value and the determined value are within a given threshold. For instance, discrepancies in the position beyond a prescribed threshold or range of threshold values (e.g., a distance, percentage change, etc.) indicates performance issues with one or both of the bypass valve 112 or the secondary pump 110. If the comparison is within the accepted threshold, the method returns to block 502 and continues to monitor the metering system. If the comparison is outside the accepted thresholds, the controller 104 generates an alert that a discrepancy has been determined in block 510. The alert can be a signal transmitted to a user interface and/or a remote device associated with the system that incorporates the dual pump and/or the engine (e.g., a vehicle, aircraft, etc.). The alert may also instruct the controller 104 to adjust the operating mode of the metering system, such as a case where the primary pump 106 is below threshold performance, the controller would instruct the secondary pump 110 to operate at all operating cases (start through high power conditions).

Example systems that employ a high accuracy flow meter advantageously allows for removal of engine flowmeters, thereby saving engine cost, weight, and/or envelope. Depending on the flow sense technology used, other information may also be available via the flow sensor, such as fuel temperature, and fuel specific gravity.

Example systems incorporate a servo flowmeter. However, depending on the engine system requirements and particular application, the servo flowmeter may be eliminated and mitigated with a simplified control scheme for one or more of the disclosed example dual pumping systems.

In some examples, a pump sizing approach is implemented to reduce system weight and/or complexity. For instance, sizing the primary pump 106 includes determination of engine windmill relight conditions, which correspond to rare events. Sizing the secondary pump 110 can include determination of conditions from normal start through take-off (likely not windmill relight), where an appropriately sized secondary pump 110 is capable of meeting normal operating engine needs when the primary pump 106 is disabled. The likelihood of a simultaneous windmill relight event and a primary pump failure are very rare, and therefore a single channel primary pumping system is acceptable. As a result, motor and motor controller weight and packaging are reduced.

In disclosed examples, a system to deliver fuel to an engine includes a primary pump to deliver a first fluid flow to the engine via a pump outlet; a secondary pump to deliver a second fluid flow; and a fuel metering valve to return the second fluid flow to a pump inlet in a first position, and to channel the second fluid flow to the pump outlet in a second position.

In some examples, the system further includes a bypass valve operable to channel the second fluid flow to the pump inlet when the fuel metering valve is in the first position.

In examples, the bypass valve is operable to restrict the second fluid flow to the pump inlet when the fuel metering valve is in the second position, thereby increasing a pressure at the pump outlet.

In some examples, the system further includes a servo switch valve operable to channel a portion of the first fluid flow from the pump inlet when the fuel metering valve is in the first position, and to channel a portion of the second fluid flow from the pump inlet when the when the fuel metering valve is in the second position.

In some examples, the system further comprising a pump motor to drive the primary pump.

In examples, the pump motor comprises one of a brushless direct current (DC) motor, a brushed DC motor, a permanent magnet synchronous motor, or an induction motor.

In examples, the pump motor comprises a hydraulic motor.

In some examples, a speed of one of the primary pump or the secondary pump correlates to a speed of the engine.

In some examples, the system further includes a fuel tank connected to an inlet of the system.

In some examples, the system further includes one or more of a flow sensor or a pressure sensor to monitor a flow rate or a pressure at the pump outlet.

In some disclosed examples, a system to deliver fuel to an engine includes a primary pump to deliver a first fluid flow to the engine via a pump outlet; a secondary pump to deliver a second fluid flow; and a valve configured to monitor fuel demand to the engine via the first fluid flow; a controller configured receive fuel demand information from the valve and to regulate a position of a fuel metering valve if the fuel draw exceeds a capacity of the primary pump.

In some examples, the system further includes electrohydraulic servo valve configured to adjust the position of the fuel metering valve based on commands from the controller.

In some examples, the system further includes an actuator to adjust a position of the fuel metering valve to regulate fuel delivery to the engine.

In examples, the actuator is an electrohydraulic servo valve.

In some examples, the system further includes a linear variable differential transformer, wherein changes in movement of the fuel metering valve are measured by the linear variable differential transformer.

In examples, the valve is a servo switch valve.

In examples, the controller activates the primary pump to operate in a first, low fluid flow operating mode below the capacity of the primary pump.

In examples, the controller activates the secondary pump to operate in a second, high fluid flow operating mode greater than the capacity of the primary pump.

In some disclosed examples, a method to operate a pump to deliver fuel to an engine includes monitoring, via a sensor, movement of a valve corresponding to fuel demand; determine, via a controller, a position or change in position of the valve based on the movement; compare the position or change in position of the valve to a list of expected position threshold values; and determine whether the position or change in position is within an expected position threshold value.

In some examples, the method further includes a bypass valve operable to channel the second fluid flow to the pump inlet when the fuel metering valve is in the first position.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A system to deliver fuel to an engine, the system comprising:

a primary pump driven by a motor to deliver a first fluid flow to the engine via an engine discharge;

a secondary pump driven by the engine to deliver a second fluid flow; and an engine flow sensor configured to monitor fuel demand to the engine via the-engine discharge;

a controller configured to:

receive the fuel demand information from the engine flow sensor; and to regulate a speed of the primary pump and a position of a fuel metering valve if the fuel draw exceeds a capacity of the primary pump.

2. The system as defined in claim 1, further comprising an actuator to adjust a position of the fuel metering valve to regulate fuel delivery to the engine.

3. The system as defined in claim 2, wherein the actuator is an electrohydraulic servo valve.

4. The system as defined in claim 1, further comprising a linear variable differential transformer, wherein changes in movement of the fuel metering valve are measured by the linear variable differential transformer and provide an input to the controller.

5. The system as defined in claim 1, wherein the system further comprises a servo switch valve having a first position wherein a portion of the first fluid flow is directed to an inlet of the primary pump and a second position wherein a portion of the second fluid flow is directed to the inlet of the primary pump.

6. The system as defined in claim 5, wherein the position of the servo switch valve provides an input to the controller.

7. The system as defined in claim 5, wherein a second flowmeter downstream of the servo switch valve provides an input to the controller.

8. The system as defined in claim 5, wherein the servo switch valve directs the portion of the first fluid flow to the inlet of the primary pump when the fuel metering valve is closed and the servo switch valve directs the portion of the second fluid flow to the inlet of the primary pump when the fuel metering valve is not closed.

9. The system as defined in claim 1, wherein the controller activates the primary pump to operate in a first, low fluid flow operating mode below the capacity of the primary pump.

10. The system as defined in claim 1, wherein the secondary pump is connected to a gearbox and the gearbox is connected to the engine.

11. The system defined in claim 1, wherein the primary pump is a positive displacement pump.

12. The system as defined in claim 1, further comprising a delta pressure regulator configured to send a portion of the second fluid flow to the secondary pump inlet.

13. The system as defined in claim 12, wherein the delta pressure regulator operates at a first differential pressure when the fuel metering valve is in a closed position and a second differential pressure when the fuel metering valve is not in the closed position.

14. The system as defined in claim 13, wherein the first differential pressure is measured across the secondary pump and the second differential pressure is measured from an inlet of the secondary pump to a fuel metering port on an outlet side of the fuel metering valve.

15. The system as defined in claim 1, wherein an input to the controller comprises at least one of an engine speed or a fuel temperature.

16. The system of claim 1, wherein the controller is in communication with the engine flow sensor, the fuel metering valve, and the motor.

17. The system of claim 1, wherein the secondary pump is capable of supplying fuel over the engine's entire operating envelope.

18. A system to deliver fuel to an engine, the system comprising:

a primary pump to deliver a first fluid flow to the engine via an engine discharge;

a secondary pump to deliver a second fluid flow;

wherein a portion of the second fluid flow is delivered to the engine via a secondary output and a portion is delivered to the engine discharge downstream of a fuel metering valve;

a controller;

the fuel metering valve having a closed position if the first fluid flow is below the capacity of the primary pump and a second position if the fuel draw exceeds a capacity of the primary pump; and a delta pressure regulator configured to send a portion of the second fluid flow to a secondary pump inlet, wherein the delta pressure regulator operates at a first differential pressure when the fuel metering valve is in a closed position and a second differential pressure when the fuel metering valve is not in the closed position, wherein the controller controls the position of the fuel metering valve.

19. The system as defined in claim 18, wherein the first differential pressure is measured across the secondary pump and the second differential pressure is measured from the secondary pump inlet to a fuel metering port on an outlet side of the fuel metering valve.

20. The system as defined in claim 18, wherein the controller controls the position of the fuel metering valve via actuation.

* * * * *